Aug. 27, 1957 K. L. DEWING 2,804,082
LIPSTICK MIRROR CLIP
Filed Nov. 18, 1955
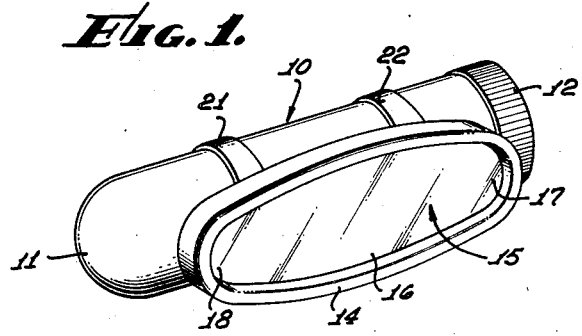
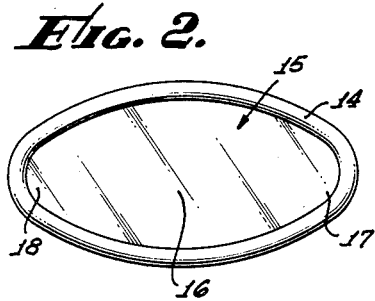
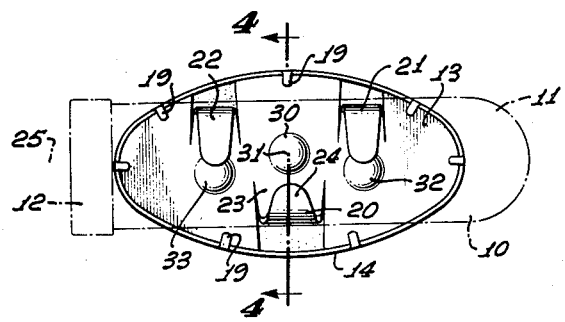
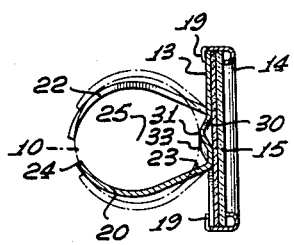
Kenneth L. Dewing,
INVENTOR.
Huebner, Beehler, Worrel & Herzig
BY
ATTORNEYS.

United States Patent Office 2,804,082
Patented Aug. 27, 1957

2,804,082

LIPSTICK MIRROR CLIP

Kenneth L. Dewing, North Hollywood, Calif.

Application November 18, 1955, Serial No. 547,803

5 Claims. (Cl. 132—83)

The invention relates to fasteners for tubular objects and has particular reference to a relatively flat device provided with a set of clips so arranged that they comprise a fastener and having such form that they encompass the tubular support or object on which the fastener is to be attached, thereby to grip the tubular support with a combination of spring tension and friction to firmly anchor the fastener on the tubular device.

Somewhat more particularly the fastener is one especially well adapted to securing a small object such as a mirror to a cylindrical or tubular case of a kind which might contain a lipstick or other pencil or stick of appropriate nature.

The tendency has been in recent times to reduce articles of daily use to small dimensions such that they can be easily carried about without encumbering the user. This trend has led to the combining of various articles of personal use so that they operate together as a unit.

Various attempts have been made in the past to provide handy mirrors for use in connection with compacts and lipsticks and to provide some means for fastening the mirror to the case for the appropriate cosmetic. To a large extent the attachment has been of a permanent or semi-permanent nature such that the parts would have to be built to match each other in the first instance. On such occasions as where parts have been made as attachments, the attaching means has been such that following conventional practice the attachment tends to become loose during use with the result that the parts ultimately become separated and the effectiveness of a unitary arrangement is lost.

It is therefore among the objects of the invention to provide a new and improved fastener which is capable of securing virtually any object to a tubular support with a firm grip sufficient that the article fastened is not easily dislodged.

Another object of the invention is to provide a new and improved fastening device by means of which relatively flat objects can be attached to a tubular object with the points of pressure so arranged and spaced that by using spring tension in the fastener coupled with the application of frictional force at small well-defined locations spring tension and friction can be depended upon to supply a positive grip.

Still another object of the invention is to provide a new and improved mirror frame fastening means by means of which small objects such as a mirror can be firmly anchored to a tubular casing such as that containing lipstick, the fastening means being compact and concealed as view from the front and which moreover is sufficiently simple in its design and structure as to be capable of being manufactured with a considerable degree of economy thereby making the appurtenance readily available to all who might desire to purchase it.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side perspective view of a lipstick case with a mirror attached by use of the fastening means.

Figure 2 is a front elevational view of a mirror upon which the fastening means may be used.

Figure 3 is a rear elevational view of the fastener means with the object upon which the fastener means is to be attached shown in broken lines for clarity and revealing the structure of the fastening means.

Figure 4 is a cross-sectional view taken on the line 4—4 of Figure 3.

In an embodiment chosen for the purpose of illustration there is shown what may be designated as a conventional lipstick case 10 comprising a tubular body having a drawn rounded end 11 and provided with a cap 12 which may be screw threaded or otherwise applied by some appropriate conventional means to the case. Ordinarily cases of this kind are very smooth surfaced, being polished and plated with brass, silver, or other high metallic finish. The improvement is embodied essentially in a frame for a mirror, this being an object most appropriate for attachment to a lipstick holder. The mirror includes a relatively flat backing or base 13 to which is attached a frame 14 whereby to secure a piece of mirror glass 15. It will be noted that the frame and the attached mirror glass has a particular shape in that it is somewhat generally elliptical, being rather wide over a mid-portion 16 and somewhat narrow at end portions 17 and 18. The end portions as well as the mid-portion are rounded for convenience and appeal and also for the purpose of giving the mirror a maximum amount of what might be termed "seeing" area by making use of a minimum quantity or area of the mirror glass itself.

For convenience and economy the frame 14 is attached to the base 13 by a series of bent fingers 19 spaced about the rear edge of the frame so that they can be bent to a sufficient distance over the surface of the base to securely anchor the frame to the base.

On the rear face of the base is a series of three alternately positioned clips. These clips in their form and with respect to their positioning form an important portion of the invention. The series consists of a middle clip 20 and end clips 21 and 22. The middle clip, for example, is constructed of a bent up portion of the base which may preferably be of such metallic consistency that it can be heat treated to preserve its springiness once being given the concave form shown in the drawing. The middle clip, for instance, has one end 23 anchored to the base by reason of the fact in the selected embodiment that it is part of the base. The means of anchoring is, however, of secondary importance. The middle clip 20, moreover, has a free end 24 outstanding from the base. The middle clip is relatively flat, is wider at the anchored end 23 than at the free end 24, and is concavely shaped on the inner side as viewed in Figure 3. It will be noted further that the radius of curvature of the middle clip is less than the radius of curvature of the case 10 when the clip is contracted before application to the case. The clip moreover throughout its arcuate perimeter is less than semi-circular and in fact departs to a degree from a true curve at the portion near the anchored end 23. Each of the end clips 21 and 22 is similarly formed and proportioned. By reason of the fact that the points of application of the end clips 21 and 22 are spaced outwardly from the point of application of the middle clip 20 and by reason of the fact that there are two clips at the ends, the breadth of these clips can be less than the breadth of the clip 20. It is not requisite, however, that the breadth of the clip 20 be twice that of either of the clips 21. The radius of curvature and general configuration of the clips 21 and 22 is the same as that of the clip 20.

It will be noted moreover that the anchored ends of the clips are in staggered relationship, the anchored ends being on alternately opposite sides of a central axis 25 of the case 10. The axis 25 may be also assumed to be the axis of a theoretical cylindrical space defined by the inwardly facing concave sides of the clips 21, 22 and 20.

Opposite the anchored end 23 of the clip 20 is a knob 30 which for convenience may be an evenly rounded knob presenting one high point 31. The high point will be so positioned that it physically engages the circumference of the case 10 on a side of the axis 25 opposite from the area of engagement of the concave portion of the corresponding middle clip 20.

Similarly a knob 32 has relatively the same shape and is located adjacent the base of the clip 21 and spaced with its high point on a transverse side of the axis 25 opposite from the area of engagement of the corresponding clip 21. A knob 33 is of the same general construction and is located adjacent the end clip 22 and on the same side of the axis 25 as is the knob 32.

In use the case has the position shown to particularly good advantage in Figures 3 and 4. In that position the knobs 32 and 33 contact the surface of the case at points of contact and on a side of the axis opposite from the point of contact of the knob 30. By reason of having points of contact a tighter grip is maintained on the smooth surface thereby assisting the spring tension in maintaining a snug contact with the case. Since the radius of curvature of the clips is slightly smaller than the radius of curvature of the case, these will be distended and the spring tension will add to the gripping effect of the fastener upon the case. Moreover, the staggered arrangement of the clips as well as the knobs greatly aids in forming a very snug contact not easily disturbed and combines the gripping effect of the spring with the frictional force exerted by the point contacts of the knobs.

The design and structure is such that a relatively inexpensive fastening means is provided which is particularly secure in its attachment and which can be readily adjusted and adapted to cases of varying diameters within reasonable limits of the material used.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A fastener for securing articles to a generally cylindrical support at a location wherein the article is spaced from the axis of the support, said fastener comprising a base, a series of at least three knobs on the base arranged in staggered relation with alternate knobs on opposite sides of said axis, and spring clip means on the base extending laterally outwardly and over all said knobs and to a location more than halfway around the cylindrical support whereby the support is pressed against the knobs.

2. A fastener for securing articles to a tubular support comprising a base, a plurality of flat concavely formed spring clips having one end anchored to the base and having a free end located outwardly thereof, two of said clips being spaced laterally on the base and having the concave side facing in an inward direction, one of said clips being spaced intermediate said first two clips and having the concave side facing in an inward direction, said clips defining a generally cylindrical space with a central axis thereof extending intermediate oppositely positioned clips, said clips having anchored ends on their respective side of said axis, and a knob on the base adjacent the anchored end of each clip, each knob being located on a side of the axis opposite from the respective clip.

3. A fastener for securing articles to a tubular support comprising a substantially flat base, a series of three flat concavely formed spring clips having one end anchored to the base and having a free end located outwardly thereof, each clip comprising an arc of less than a semi-circle and of a lesser degree of curvature than the tubular support to which the fastener is adapted to be attached, two of said clips being spaced laterally on the base and having concave sides thereof facing in an inward direction, one of said clips being spaced intermediate said first two clips and having the concave side thereof facing in an opposite direction, said clips defining a generally cylindrical space with a central axis thereof extending intermediate oppositely positioned clips, said clips having anchored ends in staggered positions on their respective side of said axis, and a knob on the base adjacent the anchored end of each clip, each knob being located on a side of the axis opposite from the respective clip.

4. In a combination cylindrical lipstick case and mirror fastening frame a base for the frame, a series of at least three alternately facing concave clips of relatively flat spring material spaced laterally one from another, each clip having an arcuate shape, a middle clip of said series having one end anchored to the base and a knob on the base adjacent and spaced from said one end and having a point of engagement with the case on a side of the axis opposite from the respective clip, end clips of said series each having one end anchored to the base, and a knob on the base adjacent and spaced from the anchored end of each clip and having a point of engagement with the case on the side of the axis opposite from the respective clip.

5. In a combination cylindrical lipstick case and mirror fastening frame a substantially flat base for the frame, a series of three alternately facing concave clips of relatively flat spring material spaced laterally one from another, each clip having an arcuate shape of less than a semi-circle and being of diameter less than the case, a middle clip of said series having one end anchored to the base on one transverse side of the axis of said case and a knob on the base adjacent and spaced from said one end and having a point of engagement with the case on a side of the axis opposite from the respective clip, end clips of said series each having one end anchored to the base at a location spaced equidistant from the middle clip, and a knob on the base adjacent and spaced from the anchored end of each clip and having a point of engagement with the case on the side of the axis opposite from the respective clip.

References Cited in the file of this patent

UNITED STATES PATENTS 2,473,226 Sheldon _____ June 14, 1949

FOREIGN PATENTS 1,008,982 France _____ Feb. 27, 1952